United States Patent Office 3,541,172
Patented Nov. 17, 1970

3,541,172
STRONTIUM NICKEL PHOSPHATE
DEHYDROGENATION CATALYST
Robert A. Stowe, Zen C. Hanger, and Richard W. Roberts,
Ludington, Mich., assignors to The Dow Chemical Company, Midland, Mich., a corporation of Delaware
No Drawing. Continuation-in-part of application Ser. No. 586,315, Oct. 10, 1966. This application Mar. 25, 1968, Ser. No. 715,491
Int. Cl. C07c 5/18; C01b 25/32
U.S. Cl. 260—669        31 Claims

ABSTRACT OF THE DISCLOSURE $\beta$-Strontium nickel phosphate and strontium nickel pyrophosphate and mixtures thereof are catalysts for dehydrogenating monoolefins, having at least four carbon atoms in a chain, to diolefins and alkyl aromatic hydrocarbons to $\beta$-alkenyl aromatics. These new compounds also catalyze the dehydrogenation of olefins to dienes, alkyl aromatic hydrocarbons to alkene aromatics, and alkanes having at least four carbon atoms in a chain to mixtures of dienes and monoolefins and alkyl aromatic hydrocarbons to alkene aromatics in the presence of molecular oxygen and bromine. The catalyst precursors are also new. These are made by co-precipitation of a strontium nickel phosphate material at a pH of 5.0 to 9.5.

---

This application is a continuation-in-part of U.S. patent application Ser. No. 586,315, filed Oct. 10, 1966, and entitled "Catalyst" and now abandoned.

This invention concerns new, solid $\beta$-strontium nickel phosphate or strontium nickel pyrophosphate and mixtures thereof, which are dehydrogenation catalysts and a method for preparing said catalysts. Further, this invention concerns an improved method of producing aliphatic conjugated diolefins by the dehydrogenation of saturated and olefinic unsaturated hydrocarbons containing four or more carbon atoms in the chain of the molecule, without causing extensive cracking, or other decomposition of the hydrocarbons. The process also concerns the dehydrogenation of alkylaromatics to produce alkenyl aromatics in which the alkenyl double bond is conjugated with the unsaturation of the aromatic nucleus. The dehydrogenation can be effected either in the presence or absence of oxygen and a halogen.

Processes for the dehydrogenation of butene to butadiene, isopentene to isoprene, and ethylbenzene to styrene are, well known. Increased industrial demand for synthetic rubbers and other products prepared from these diolefins has increased the importance of research efforts to find new processes and/or new catalysts for producing these diolefins. One of the best known commercial processes for the production of such diolefins is a dehydrogenation process wherein $C_4$–$C_6$ olefins are converted to $C_4$–$C_6$ diolefins in the presence of a calcium nickel phosphate type catalyst. This process requires the presence of large proportions of steam and periodic regeneration of the catalyst in the presence of steam and air. The calcium nickel nickel phosphate catalyst and the processes for its use in dehydrogenation reactions are disclosed in U.S.

Pats. Nos. 2,442,319; 2,442,320; 2,456,367; 2,456,368; 2,542,813; and 2,816,081.

The conventional commercial process for producing butadiene employs the processes of these patents. The commercial process, in more detail, comprises passing a stream of normal butylenes and large quantities of steam, usually from 15 to 20 volumes of steam per volume of the hydrocarbons, into a chamber containing a bed of calcium nickel phosphate catalyst and maintaining the temperature in said chamber at about 550° to 750° C. The effluent vapor mixture containing the desired diene is cooled and the unconsumed butylene, the by-products and other impurities are removed. The unconsumed butylene, separated from the by-products and other impurities, is recycled in the process.

During use in the dehydrogenation reaction, the calcium nickel phosphate catalyst gradually accumulates small amounts of carbon or non-volatile carbonaceous material and becomes less selective as a dehydrogenation catalyst. If these carbonaceous deposits are allowed to remain on the surface of the catalyst, they lead to accelerated and excessive carbon laydown and eventually to the formation of a carbon "mound" within the catalyst bed. Accordingly, the flow of hydrocarbons is periodically interrupted and the gaseous hydrocarbons are purged from the catalyst bed with steam. After purging, an oxygen-containing regeneration gas (usually air, although $O_2$ is sometimes employed) is fed into the bed along with superheated steam, usually in a volume ratio to provide about one part of air to six parts of steam. The regeneration cycle is of such duration as necessary to oxidize the carbonaceous deposits and thus return the catalyst to its former selective activity. The flow of oxygen-containing gas is then interrupted, the catalyst bed purged of the oxygen-containing gas with steam, and the olefin-containing starting material in admixture with superheated steam is again fed to the catalyst bed.

The above-described operations define a conventional operating cycle as follows: (1) a "process" period in which the reaction mixture of steam and olefin-containing hydrocarbons is passed through the bed, (2) a "purge" period in which gaseous hydrocarbons are removed from the bed by passing steam alone through the bed, (3) a "regeneration" period in which any carbonaceous deposits are removed by combustion with a mixture of steam and air or other oxygen-containing gas, and (4) a second "purge" period in which steam alone is fed to the bed to remove air or $O_2$ from the bed.

After many such cycles of operation, the aforementioned calcium nickel phosphate catalysts gradually lose catalytic activity for conversion of olefins to diolefins. In commercial practice, this drop in activity is compensated for by increasing the temperature of the reacting gases. This technique to maintain production contributes to a decline in catalytic activity and strength of the catalyst. Finally, the useful life of the catalyst is terminated, usually by the sudden formation of a carbon mound which cannot be burned off during the regeneration period and which quickly grows to such size in the bed as to make further operation impractical and requires shutdown of the unit.

The excessive carbon mound build-up in the latter stages of catalyst life, under the normal cyclic operation, may result in part from the increased cracking of the hydrocarbons as the temperature is increased to maintain activity and may also be due in part to the effect of dust particles of the catalyst. Such dust may arise from the attrition and abrasion of the bed of pellets when large volumes of flow are suddenly shut off, as during the switching operations necessary to shift from process to a regeneration described above. Prevention of such dusting of the calcium nickel phosphate catalyst is the subject of Canadian Pat. No. 628,782.

The general use of large volumes of steam per volume of hydrocarbon fed in the process results in production of certain undesirable compounds such as, for example, carbon monoxide, carbon dioxide, acetone, methyl ethyl ketone, and the like. The ketones are believed to be produced by the reaction of olefins or acetylenes with water. The ketones must be removed by a separate extraction step to provide a useable butadiene product.

It is an object of the present invention to provide new and novel compositions of matter comprising a solid $\beta$-strontium nickel phosphate, strontium nickel pyrophosphate and mixtures thereof, which are catalysts useful for dehydrogenating hydrocarbons. It is a further object of this invention to provide a novel method by which such new solid strontium nickel phosphate catalysts can be prepared. It is a still further object of the present invention to provide a dehydrogenation catalyst containing strontium nickel phosphate which can withstand the high temperatures required in the dehydrogenation of aliphatic olefins to diolefins, which substantially minimizes cracking of the hydrocarbon, thereby reducing carbon deposits on the catalyst during process periods, which substantially reduces the formation of carbonyl compounds, carbon monoxide and carbon dioxide, and which shows markedly increased resistance to dusting. It is another object of this invention to provide an improved process for the dehydrogenation of olefins to diolefins, employing a bed of strontium nickel phosphate catalyst which, because of its catalytic properties, allows the employment of higher temperatures, lower steam-to-hydrocarbon feed ratios, and a larger percentage of the operating cycle time for the process period, and which utilizes a much lower quantity of steam in the regeneration steam-air mixture. It is a still further object of the present invention to provide a dehydrogenation catalyst containing strontium nickel phosphate which can be effectively used as the catalytic material in a continuous dehydrogenation process for the dehydrogenation of aliphatic hydrocarbons, both saturated and unsaturated, in which process a halogen and oxygen are employed. Other objects will be evident to those skilled in the art from the following description and claims.

It has now been found that one or more of the above objects, as well as others, can be realized by the provision, preparation and use of novel catalytic materials containing strontium, nickel and the phosphate radical, which includes the pyrophosphate radical. The catalyst is made by co-precipitation of a product having strontium and nickel atoms chemically combined with the phosphate radical. The strontium nickel phopshates have a ratio of from about 2 to about 20 atoms of strontium per atom of nickel and from 1 to about 2 atoms of strontium and nickel, combined, per atom of phosphorus.

The freshly precipitated strontium nickel phosphate materials are believed to be amorphous, since they give no X-ray diffraction patterns.

When dried at 100–300° C. the strontium nickel phosphates, of the above defined atomic ratios, are light, tan colored materials which exhibit three novel X-ray powder diffraction patterns. The degree of crystallinity at this stage is partially dependent on the temperature and time of drying. Three novel phases of the dried material have been differentiated by examination of the power diffraction patterns.

One of the crystalline phases of the dried powder has been designated as $\beta$-strontium nickel phosphate, because of its iso-structural relationship to Whitlockite, or $\beta(Ca)_3(PO_4)_2$. Table I, below, shows the data for $\beta$-strontium nickel phosphate.

TABLE I

[X-ray powder diffraction data for $\beta$-strontium nickel phosphate]

| d | $I/I_1$ | (hkl) |
|---|---|---|
| 8.5 | 5 | 110 |
| 6.7 | 8 | 211 |
| 5.3 | 25 | 10$\bar{1}$ |
| 4.48 | 10 | 200 |
| 3.59 | 25 | 433 |
| 3.41 | 15 | 21$\bar{3}$ |
| 3.35 | 5 | 43$\bar{2}$, 422 |
| 3.27 | 30 | 310 |
| 3.06 | 10 | 2$\bar{1}\bar{1}$ |
| 2.97 | [1] 100 | 442, 421 |
| 2.83 | 13 | 431 |
| 2.78 | 13 | 411, 330, 543 |
| 2.65 | 63 | 20$\bar{2}$ |
| 2.59 | 10 | 31$\bar{1}$ |
| 2.45 | 5 | 32$\bar{1}$, 420 |
| 2.36 | 5 | 654 |
| 2.23 | 20 | 633, 552, 400 |
| 2.17 | 10 | 664 |
| 2.08 | 20 | 632, 440 |
| 2.5 | 15 | 41$\bar{1}$, 642 |
| 1.98 | 30 | 622, 32$\bar{2}$, 60$\bar{1}$ |
| 1.93 | 20 | 776, 530 |
| 1.91 | 15 | 510 |
| 1.85 | 13 | 631 |
| 1.83 | 13 | 22$\bar{3}$, 733 |
| 1.80 | 30 | 33$\bar{2}$ |
| 1.76 | 15 | 30$\bar{3}$, 763 |

[1] Equals $I_1$.

In this table and subsequent tables showing X-ray diffraction data, $d$ represents the distance between planes of the atoms in the crystal structure, measured in angstrom units. These distances are calculated from Braggs' well known formula $n\lambda = 2d \sin \theta$. $I/I_1$ represents the relative intensity of a particular line of the pattern, based on a value of 100 for the strongest line, and hkl are Miller indices of the lines.

The $\beta$-strontium nickel phosphates are not iso-structural with $(Sr)_3(PO_4)_2$, since the $\beta$ form of this latter compound is not known. This fact is taken as evidence that the nickel atoms are occupying sites in the crystal lattice and that $\beta$-nickel strontium phosphates are truly mixed metal phosphates. The $\beta$-strontium nickel phosphates, the normal $(Sr)_3(PO_4)_2$ and $\beta(Ca)_3(PO_4)_2$ all have rhombohedral structures. The lattice constants referred to their respective hexagonal unit cells are shown below:

| | a | c |
|---|---|---|
| $\beta(Ca)_3(PO_4)_2$, A | 10.43 | 37.47 |
| $\beta$-Strontium nickel phosphate, A | 10.56 | 39.5 |
| $(Sr)_3(PO_4)_2$ | 5.39 | 19.77 |

A second novel crystalline phase in the dried material is believed to be an acidic strontium nickel phosphate, the structure of which is not correlated with any known strontium phosphate. This structure is favored by low temperature precipitation. The powder X-ray diffraction pattern is set out in Table II below:

TABLE II

X-ray powder diffraction data for acidic Sr-Ni-phosphate of unknown structure

| d: | $I/I_1$ |
|---|---|
| 9.2 | 5 |
| 5.8 | 10 |
| 4.56 | 25 |
| 4.15 | 4 |
| 3.96 | 5 |
| 3.74 | 100 |
| 3.61 | 8 |
| 3.36 | 40 |

TABLE II—Continued

| d: | $I/I_1$ |
|---|---|
| 3.25 | 50 |
| 3.13 | 40 |
| 3.02 | 8 |
| 2.88 | 40 |
| 2.70 | 15 |
| 2.62 | 20 |
| 2.59 | 6 |
| 2.46 | 10 |
| 2.45 | 4 |
| 2.39 | 5 |
| 2.33 | 25 |
| 2.27 | 40 |
| 2.22 | 20 |
| 2.19 | 20 |
| 2.12 | 5 |
| 2.10 | 5 |
| 2.04 | 18 |
| 2.03 | 15 |
| 1.94 | 40 |
| 1.90 | 10 |
| 1.86 | 30 |
| 1.84 | 10 |
| 1.82 | 6 |
| 1.805 | 8 |
| 1.78 | 25 |
| 1.735 | 6 |
| 1.69 | 20 |

The third X-ray diffraction pattern appears most frequently in dried precipitates formed at high temperatures. This crystalline phase is believed to be an α-strontium nickel acid phosphate. The powder X-ray diffraction pattern is set out in Table III below:

TABLE III

X-ray powder diffraction data for structure defined as α-strontium nickel acid phosphate

| d: | $I/I_1$ |
|---|---|
| 7.0 | 8.0 |
| 5.05 | 8.0 |
| 4.84 | 5.3 |
| 4.68 | 5.3 |
| 4.50 | 5.3 |
| 4.40 | 5.3 |
| 4.25 | 8.0 |
| 3.75 | 8.0 |
| 3.48 | $100.0=I_1$ |
| 3.38 | 8.0 |
| 3.19 | 13.3 |
| 3.02 | 80.0 |
| 2.98 | 33.3 |
| 2.84 | 40.0 |
| 2.61 | 20.0 |
| 2.52 | 26.7 |
| 2.33 | 13.3 |
| 2.22 | 8.0 |
| 2.24 | 13.3 |
| 2.18 | 13.3 |
| 2.12 | 5.3 |
| 2.05 | 16.0 |
| 1.97 | 26.7 |
| 1.91 | 8.0 |
| 1.88 | 10.7 |
| 1.85 | 5.3 |
| 1.82 | 5.3 |
| 1.80 | 20.0 |
| 1.79 | 8.0 |
| 1.76 | 5.3 |
| 1.73 | 20.0 |
| 1.70 | 13.3 |
| 1.64 | 5.3 |
| 1.60 | 13.3 |
| 1.54 | 10.7 |
| 1.49 | 8 |

TABLE III—Continued

| d: | $I/I_1$ |
|---|---|
| 1.43 | 10.7 |
| 1.41 | 10.7 |
| 1.35 | 5.3 |
| 1.32 | 8 |
| 1.30 | 5.3 |
| 1.23 | 8 |
| 1.21 | 5.3 |
| 1.20 | 5.3 |
| 1.185 | 10.7 |

The dried strontium-nickel phosphate materials prepared by the procedures given below have appeared to be either chiefly the unknown structure defined by the X-ray diffraction data of Table II or the β-strontium nickel phosphate of Table I or mixtures of the two structures.

The exact structure of all the crystalline states in the dried material has not been determined. The crystals, when present, can be in any one of the three forms described in Tables I, II and III or mixtures of all three crystalline states.

After roasting in steam and air at 450–750° C. or in a muffle furnace at corresponding temperatures, the heretofore unknown acidic strontium nickel phosphate structures are apparently converted to yet another novel, crystalline, strontium nickel phosphate material which is isostructural with strontium pyrophosphate. The β-strontium nickel phosphate in the powder appears to remain unaltered in crystalline structure afer roasting. The material that is roasted is highly crystalline and it is probable that all such phases actually present in concentrations of about 5% or greater are detectable by the X-ray diffraction technique. The catalyst materials of this invention, when roasted at 550–750° C. yield either β-strontium nickel phosphate, strontium nickel pyrophosphate or mixtures of the two crystalline phosphates.

The powder X-ray diffraction data for strontium nickel pyrophosphate which is probably produced by conversion of at least part of the acid phosphates of Tables II and III are given in Table IV, below.

TABLE IV

X-ray powder diffraction data for strontium nickel pyrophosphate

| d: | $I/I_1$ |
|---|---|
| 5.32 | 12 |
| 4.90 | 15 |
| 4.20 | 10 |
| 3.61 | 10 |
| 3.54 | 10 |
| 3.46 | 42 |
| 3.43 | 41 |
| 3.34 | 41 |
| 3.28 | 8 |
| 3.10 | 100 |
| 3.07 | 41 |
| 3.00 | 16 |
| 2.98 | 25 |
| 2.90 | 16 |
| 2.87 | 13 |
| 2.84 | 12 |
| 2.77 | 9 |
| 2.65 | 24 |
| 2.63 | 10 |
| 2.43 | 14 |
| 2.40 | 6 |
| 2.31 | 15 |
| 2.26 | 8 |
| 2.22 | 6 |
| 2.18 | 15 |
| 2.16 | 22 |
| 2.06 | 22 |
| 2.01 | 19 |
| 1.92 | 13 |

The general procedure for making the catalyst is to blend the strontium, nickel and phosphate containing materials in aqueous media in the proportions required to provide the requisite strontium to nickel and combined metal to phosphorus ratios, while maintaining the bulk pH of the reaction system in a range of from about 5.0 to about 9.5.

Specific processes for making the catalyst can be (1) feeding one stream containing a mixture of water soluble nickel and strontium salts and another stream containing an alkaline phosphate, such as ammonium phosphate, into a reactor or precipitator in such quantities that the pH is maintained within desired values; (2) one preferred process comprises feeding an aqueous solution having the requisite ratios of a strontium compound, a nickel compound and phosphoric acid into a reactor as one stream and gaseous or aqueous ammonia as the second stream, each stream being fed at such a rate that the desired bulk pH of the mixture is maintained; (3) another preferred process comprises blending a solution or slurry of strontium hydroxide with a solution of a nickel compound in aqueous phosphoric acid in a reactor in the quantities needed to maintain the defined metal to metal and metal to phosphorus ratios and the bulk pH of the mixture at 5.0 to 9.5; (4) feeding separate streams of the reactants in such quantities as to maintain the Sr, Ni, and P ratios within the limits defined above and maintaining the pH within the above defined values with an alkaline material, which is preferably $NH_3$ or strontium hydroxide; (5) feeding an aqueous solution having the proper ratio of strontium to nickel salts and phosphoric acid to an aqueous ammonium hydroxide or aqueous amine solution, until the requisite pH is attained; (6) feeding an aqueous solution containing the proper ratio of strontium and nickel salts to a solution of diammonium phosphate until the requisite pH is attained or vice versa e.g. feed the diammonium phosphate solution to a solution containing the strontium and nickel salts.

The strontium nickel phosphate readily forms a flocculent precipitate. The precipitate is separated by known means, such as filtration, decanting or centrifuging, is washed, if desired, and again separated and dried. The dried material is then ground to the requisite fineness, usually so that it passes through a 12 mesh sieve. Preferably, the granules obtained are blended with a small amount of lubricant (1–5%), such as graphite, pelleted and roasted. If desired, the granules can be roasted without pelleting.

The starting materials which can be used to make the catalysts include water soluble salts of strontium, such as the chloride, bromide, iodide, nitrate, formate, acetate or propionate, strontium compounds which dissolve in aqueous phosphoric acid, such as oxide bicarbonate or carbonate, or strontium hydroxide in solution or as a slurry.

The nickel salts or compounds which can be employed include nickel bromide, chloride, iodide, nitrate, nickel ammonium phosphates, or other nickel phosphates or nickel metal or compounds which dissolve in aqueous phosphoric acid, such as the oxide, bicarbonate, basic carbonate or carbonate. The solutions of nickel metal or compounds which are soluble in aqueous phosphoric acid are especially useful for procedures (2) and (3) above.

The source of the phosphate radical can be ortho phosphoric acid or a phosphoric acid which is wholly or partially neutralized with an alkali metal oxide, hydroxide, bicarbonate or carbonate (e.g. sodium, potassium) or ammonia or an amine. Suitable water soluble amines include dimethylamine, trimethylamine, ethylamine, diethylamine or triethylamine.

The catalysts made by the described processes, after roasting at 450–750° C. are highly crystalline and contain from 0 to 100% of β-strontium nickel phosphate and 0 to 100% strontium nickel pyrophosphate or mixtures of the two structures.

The ratio of the sum of nickel and strontium atoms per phosphorus atom is preferably maintained within the range of from about 1 to about 1.65 in the feed streams. The ratio of strontium to nickel in the feed streams must also be controlled, otherwise the resultant precipitate will not show sufficient catalytic activity for dehydrogenation. If the ratio of strontium to nickel in the feed is less than 2 to 1, respectively, or greater than 12 to 1, catalyst activity decreases somewhat. Likewise, the pH of the mixture from which the catalyst precipitates should be controlled, for even with the proper ratio of strontium to nickel, and the proper ratio of strontium and nickel to phosphoric atoms, a pH much below 5.0 or above 9.5 can markedly change the ratio of strontium and nickel to phosphorus atoms in the phosphate precipitate and thus produce a catalyst of different composition and activity than desired.

The starting materials, when fed to the reaction chamber, preferably, should contain water in amount such that the slurry which is formed contains less than 5, and usually less than 2, percent by weight of precipitated, flocculent, strontium nickel phosphate product. The employment of large proportions of water is advantageous in that it permits more ready and accurate control of the pH value of the reaction mixture than would be possible when using the reactants in a state of higher concentration. However, the reactants can be used in more concentrated form, if desired.

One preferred procedure in producing the strontium nickel phosphate catalyst is hereafter set forth with reference to a continuous mode of forming the catalytic material using, as starting materials, gaseous ammonia and an aqueous solution of phosphoric acid and strontium and nickel salts, in the relative proportions hereinbefore recommended, and in concentrations slightly less than would result in precipitation of a metal salt directly from the phosphoric acid-containing solution. The aqueous solution of phosphoric acid and strontium and nickel salts is passed into a stream of water at a rate such as to be diluted with from about 20 to about 40 times its volume of water. The resultant dilute solution is fed into a tank, or other reaction vessel. Simultaneously with the introduction of the phosphoric acid-metal salts solution into the tank, ammonia gas is fed, at a point remote from the point of feed of the phosphoric acid-nickel-strontium containing solution, at a rate such as to neutralize the acid with formation of a mixture having a bulk pH value between about 5.0 and about 7.5. By use of well-known flow control devices, the rate of flow of either, or both, starting materials may automatically be controlled so as to maintain the mixture at a substantially constant pH value.

When strontium hydroxide as either a slurry or solution in water, is used as an ingredient, the pH range over which catalysts can be prepared will vary from 5.0 to 9.5 preferably 7.5 to 9.0.

The preferred procedure for making the catalyst with strontium hydroxide is to feed into the reactor an aqueous solution or slurry of the hydroxide as one stream and an aqueous solution of the nickel ingredient and phosphoric acid as a second stream, while maintaining the bulk pH of the reaction system within the specified range. Another procedure that can be employed is to feed the aqueous solution of nickel ingredient and phosphoric acid to the strontium hydroxide solution or slurry or the slurry can be fed to the aqueous solution of the nickel ingredient and phosphoric acid.

In any of the procedures, strontium nickel phosphate is precipitated as a flocculent material which is maintained in suspension by vigorous stirring. Once the process is started, that is, a slurry of flocculent material has been formed, the precipitation occurs in the presence of the slurry of strontium nickel phosphate or the presence of strontium hydroxide slurry.

The starting materials are continuously fed into the reaction vessel, causing overflow of the flocculent slurry from the chamber, as, for example, through an overflow line. Material overflowing may be fed directly to a filter but is preferably passed to settling tanks where the strontium nickel phosphate settles quite rapidly to form a lower layer that usually occupies from about 5 to 15 percent of the volume of the slurry fed to the tank. In the absence of agitation, settling is substantially complete after about 5 to 30 minutes of standing. The employment of a settling tank serves as a reservoir for storage of material and for blending together the insoluble strontium nickel phosphate produced over a period of a day or longer, so as to obtain a large quantity of product of substantially uniform quality throughout. The clear supernatant liquor which forms is separated from the relatively dense sludge or slurry of precipitated strontium nickel phosphate by decantation, and the sludge is fed to the filter.

The filter cake or paste is washed with water to remove soluble impurities. The dense paste obtained as the filter cake usually contains about 15 to 30 percent by weight of co-precipitated strontium-nickel phosphate and the remainder water. At this stage the precipitate, apparently, is, amorphous.

The filter cake is preferably dried by heating, e.g. at temperatures from 100° C. to 400° C., until substantially free of water. The dried product may be broken up or ground to the form of a powder and used per se as a catalyst, or it can be, and preferably is, admixed with a lubricant such as graphite or a hydrocarbon oil and pressed into pellets. Frequently, prior to pressing the material into pellets, a minor amount (0.2 to 10 percent by weight) of chromic oxide ($Cr_2O_3$) is admixed therewith as a catalyst promoter.

An alternative process for preparing the catalyst employs an alkaline ammonium phosphate solution, which may contain excess ammonia, as one stream and an aqueous solution of strontium and nickel salts (in relative proportions corresponding to between 2 and 20, preferably between 3 and 9 atoms of strontium per atom of nickel) as the other stream and feeding the two streams into the reaction chamber at relative rates of flow such that the resultant mixture is maintained at pH values of about 5.0 to about 7.5.

Other methods for obtaining the strontium nickel phosphate precipitate include the several batch processes wherein one of the feed streams is added directly to a stirred quantity of the other. Thus, an aqueous solution of strontium and nickel salts in the aforestated ranges of proportions, along with the phosphoric acid needed for precipitataion, can be added separately or co-jointly to an aqueous solution of ammonium hydroxide or other base. The addition is stopped when stoichiometric quantities have been mixed, or when the pH of the mixture falls into the range of about 5.0 to 7.5. Alternatively, the reverse mode of addition can be used in which the ammonium hydroxide solution or other base is added to the phosphoric acid solution containing the strontium and nickel salts. If desired a solution of phosphoric acid and a nickel compound can be added to a solution or slurry of strontium hydroxide or vice versa. It is to be understood that the various above-described starting materials are also applicable to each of these batch methods of preparing the catalyst. The above described procedures for filtering, washing, drying, etc., may also be used in these alternative methods.

The temperature at which the precipitation is carried out is not critical and conveniently may be in the range of 0°–40° C., but is preferably maintained at about ambient conditions.

Although the strontium nickel phosphate obtained in the foregoing manner, when dried, can be used directly as a catalyst in the dehydrogenation process, it is preferably admixed with a small amount of graphite or other removable lubricant and pressed into pellets of a more suitable size and form, e.g., pellets of approximately cylindrical shape 3/16 inch diam. x 3/16 inch in length. When so prepared, it is understood that before the pelleted catalyst achieves a suitable commercial activity, the binder or lubricant must be removed. This is usually accomplished by heating the pellets in a mixture of steam and air to a temperature of 450° C. to 750° C. to oxidize and remove the binder.

In the presence of steam the strontium nickel phosphate catalysts, so prepared and roasted, either in granular or pelleted form, are effective in catalyzing the dehydrogenation of alkyl aromatic hydrocarbons to β-alkenyl aromatic and $C_{4-6}$ monoolefins, having at least 4 C atoms in a chain, to the corresponding diolefins. More specifically, they are effective in catalyzing the dehydrogenation of ethylbenzene to styrene, n-butylenes to butadiene-1,3, isopentenes to isoprene, and 2,3-dimethyl butenes to 2,3-dimethylbutadiene-1,3. These catalysts, in the presence of steam, a source of bromine, and a source of molecular oxygen, are capable of continuously dehydrogenating the monoolefins described above to their corresponding dienes and ethyl benzene to styrene, and, in addition, are capable of dehydrogenating ethyl benzene to styrene and the $C_4$–$C_6$ alkanes, having at least 4 C atoms in a chain to a mixture of the dienes and monoolefins of the same number of carbon atoms as present in the starting alkane. Thus, n-butane is converted to a mixture of n-butylene and butadiene-1,3, 2-methyl butane is converted to a mixture of isoprene and isopentenes and 2,3-dimethyl butane is converted to a mixture of 2,3-dimethyl butadiene-1,3 and 2,3-dimethyl butenes.

A method for conducting such dehydrogenation employing the strontium nickel phosphate catalyst is generally similar to the processes of the prior art, especially the proceses employing catalysts of the calcium nickel phosphate type, with the following exceptions:

(1) The steam ratio when employing the catalyst of the present invention man be materially reduced from the 20 to 40 volumes per volume of hydrocarbon employed when using the prior art catalyst.

(2) The fraction of the total cycle time required for the regeneration phase necessary when employing the catalyst of the present invention is materially reduced from that employed with the usual or conventional calcium nickel phosphate catalyst.

(3) The space velocity of steam required during the regeneration, expressed as volumes of steam per volume of catalyst per hour, can be significantly reduced.

(4) The carbonyl separation equipment required according to the present process is smaller than with the conventional calcium nickel phosphate.

(5) The dehydrogenation temperature can be considerably higher when the catalyst of the present invention is employed than when calcium nickel phosphate is employed.

(6) The present catalyst is also capable of employment in a continuous process wherein oxygen and a source of halogen, such as bromine, are also introduced to provide a continuous process which is more fully disclosed in abandoned application Ser. No. 448,287 filed by Charles R. Noddings, Apr. 15, 1965 entitled "Process for Dehydrogenating Hydrocarbons."

As a result of these advantages there is obtained a more economical production of butadiene with a marked increase in productivity from the same number of reactors.

In producing a diolefin in accordance with the invention, a reaction chamber is charged with the granular or pelleted catalyst and the lubricant, if any is used, is removed from the catalyst by passing air, or preferably a mixture of about equal volumes of air and steam, through the catalyst bed at a high temperature, e.g., 450° to 750° C. When the lubricant used in preparing the catalyst granules is a substance capable of being vaporized (e.g., a mineral or vegetable oil), the step of treating the catalyst with air may be preceded by one of passing an inert gas such as nitrogen or carbon dioxide over the catalyst so as to vaporize at least a portion of the binding agent from the catalyst granules. The crystals formed on roasting are so minute that they cannot ordinarily be seen, even with a microscope, and the crystallization which occurs during heating of the catalyst is not apparent to the eye.

After freeing the catalyst of the lubricant, the catalyst bed is swept free of air with steam and is heated to the desired reaction temperature, preferably by passing superheated steam through the same. A mixture of steam and the olefin reactant (e.g., butylene, pentene, a hexylene, isopentene, or ethylbenzene) is then passed through the catalyst bed at a temperature between 550° and 750° C., and preferably between 575° and 700° C. The usual procedure is to mix the olefin-containing gas with steam which has been superheated to 750° C. or above (i.e., to a temperature sufficient so that the resultant mixture is at the desired reaction temperature) and to pass the mixture through the bed of catalyst. However, the heat may be supplied in other ways, e.g., by forming the steam and hydrocarbon mixture at a lower temperature and passing the mixture through a preheater to bring it to the desired temperature, or by externally heating the catalyst chamber itself. The yield of diolefin is usually highest when from 5 to 15 volumes of steam are employed per volume of the olefin-containing hydrocarbon, but the steam may be used in larger proportions, if desired, as for example 20 or more volumes. As hereinbefore mentioned, the rate of vapor flow through the catalyst chamber may be varied widely, but in practice the flow usually corresponds to between 100 and 700 volumes of the olefin (expressed as at 0° C. and 760 millimeters pressure) per volume of catalyst bed per hour.

The vapors issuing from the catalyst chamber are ordinarily passed through heat exchangers and other cooling devices to condense first the water and then the hydrocarbon products. The concentration of diolefin in the latter is dependent in part upon the concentration of the olefin reactant in the hydrocarbon starting material and cannot definitely be stated. The diolefin product may be separated from the other hydrocarbons in any of the usual ways and the unreacted olefin may be recycled in the process.

During use in the process, the catalyst gradually accumulates a small amount of carbon, or non-volatile organic material, and loses some of its activity. Accordingly, flow of the hydrocarbon starting material is periodically interrupted and air, admixed with steam, is blown through the catalyst bed, e.g. at temperatures between 450° and 700° C., and preferbaly near the dehydrogenation temperature, to oxidize and remove the carbonaceous material and thus reactivate the catalyst. Usually the ratio of process to regeneration time is from 1 to 1 to about 5 to 1, respectively.

After completing the reactivation step, the catalyst chamber is again swept free of air with steam and the introduction of an olefin, together with the steam, is resumed. Usually, reactivation of a catalyst is advisable after from 5 to 60 minutes of use in the dehydrogenation reaction. In practice, two or more catalyst chambers are employed in a system provided with connections for passing the reaction mixture alternately through different catalyst beds. One catalyst bed is employed in the dehydrogenation reaction while another is being reactivated. By operating in this manner, the dehydrogenation reaction may be carried out continuously.

The following examples are illustrative of the present invention but are not to be construed as limiting:

EXAMPLE 1

A concentrated acid-feed solution was prepared by mixing 75.9 pounds of strontium nitrate, 34.6 pounds of phosphoric acid, 100 percent basis, 9.3 pounds of nickel chloride and sufficient water to make 26 gallons. This concentrate was diluted about 29-fold to about 750 gallons with water. The diluted solution analyzed as follows: .060 M/l. (moles per liter) of $Sr^{++}$, 0.012 M/l. of $Ni^{++}$, and 0.058 M/l. of $PO_4\equiv$. This solution was introduced at the rate of about 10 gallons per hour into a stirred precipitating vessel (24 gallon capacity) containing water. Simultaneously, gaseous ammonia was introduced at a rate such that the bulk contents were maintained at a pH of approximately 6.5 and the temperature of the precipitator was controlled at 25°–27° C. After the original water had been displaced and the precipitation had reached a state of dynamic equilibrium, the overflow slurry had a 3-minute settle volume of 14–15 ml./100 ml. of slurry and a soluble alkalinity (defined as the mls. of N/10 HCl required per 100 ml. of filtered supernatant liquid to reach the modified methyl orange end point) of 5.6 to 6.1 mls. Five successive batches, each prepared in the above manner were produced. Each batch was allowed to settle for 20 hours before decantation of the clear supernatant liquid layer and filtration of the dense slurry. The filter cake was washed with water to remove soluble salts. The washed cake was dried at 150° C. for 4 hours and then at 180° C. for 26 hours. Each batch was tested to determine its catalytic activity toward the dehydrogenation of n-butene. All five batches had substantially the same activity and were blended together. The resulting material had the following analysis:

|  | Percent |
|---|---|
| Sr | 42.50 |
| Ni | 6.88 |
| $PO_4$ | 44.34 |

Sr/Ni—4.14
Metal/$PO_4$—1.29

Prior to roasting, this material by X-ray diffraction analysis showed about 25% of strontium nickel acid phosphate, as defined in Table III, 15% of strontium nickel acid phosphate, as defined in Table II and about 60% β-strontium nickel phosphate. After a six-hour roast at 650° C. in steam (3725 v./v./hr.) and air (400 v./v./hr.), the material was substantially crystalline as shown by its X-ray diffraction pattern, which indicated about 5–10% strontium nickel pyrophosphate and about 90–95% β-strontium nickel phosphate.

EXAMPLE 2

This example will illustrate the ability of the new catalyst to be used for sustained periods of cyclic operation at high temperature, without adversely affecting catalytic activity. The data are from an extended test in which the roasted catalyst of Example 1 was employed. A catalyst bed of 200 cc. was placed in a 1-inch tube furnace equipped with heating controls, butene and steam inlets, water condenser and product measuring and analyzing devices. The process conditions were:

Butene feed: 150 v./v./hr. (all space velocities are at STP)
Steam to butene volume ratio: As indicated in Table V
Cycle:
    Feed—15 minutes
    Purge—2 minutes
    Regeneration—11 minutes
    Purge—2 minutes
    Total—30 minutes
Regeneration:
    Air—400 v./v./hr.
    Steam—3000 v./v./hr.

The steam ratio and temperature were each varied during the run and these data are set forth in Table V.
Analysis of the product stream after condensing the steam was by gas-liquid chromatography. The percent conversion is defined as the "moles of n-butene consumed×100 divided by the moles of n-butene in the feed." The percent selectivity is the "moles of 1,3-butadiene produced×100 divided by the moles of n-butene consumed." The steam ratio is the steam to butene feed volume ratio. The carbon laydown was determined as carbon dioxide by the gain in weight during the regeneration period of a U-type weighing tube containing 50 percent Ascarite–50 percent alumina. It was previously found that essentially all of the carbon laydown was removed as carbon dioxide during the regeneration period. Table V shows the data at various cycles of the test.

TABLE V.—CONDITIONS EMPLOYED AND ANALYSIS OF PRODUCT GASES DURING THE INDICATED CYCLE

| Cycle | Temp., °C. | Steam to butene ratio | Percent conv. | Percent sel. | Carbon laydown, wt. percent C [1] |
|---|---|---|---|---|---|
| 58 | 640 | 21.3 | 46.02 | 94.65 | 0.19 |
| 185 | 645 | 17.5 | 42.91 | 93.87 | 0.07 |
| 249 | 655 | 17.0 | 44.02 | 92.78 | 0.01 |
| 382 | 665 | 16.8 | 45.23 | 91.29 | 0.05 |
| 496 | 670 | 17.7 | 44.30 | 90.32 | 0.08 |
| 633 | 670 | 15.7 | 42.78 | 90.25 | 0.03 |
| 701 | 675 | 17.7 | 42.92 | 89.66 | 0.01 |
| 877 | 680 | 17.1 | 44.04 | 89.33 | 0.02 |
| 1,149 | 680 | 16.6 | 42.51 | 89.08 | 0.03 |

[1] Basis C in feed.

During this period the catalyst was producing about 1.5 to 1.7 pounds of butadiene per pound of catalyst per day.

Table VI shows data on carbonyl as weight percent carbon (basis carbon in the feed) at various steam ratios and at 640° C. for cycles 58–128 and 670° C. for cycles 469–540. The remainder of the test data is the same as the test described above. These data (except for 58 and 496 cycles) were taken at different times than those in Table V and are thus set forth separately.

TABLE VI

| Cycle | Steam ratio | Carbonyl, wt. percent C [1] |
|---|---|---|
| 58 | 21.3 | 1.26 |
| 80 | 27.7 | 1.75 |
| 128 | 17.5 | 1.08 |
| 469 | 19.4 | 0.98 |
| 480 | 15.5 | 0.84 |
| 496 | 17.7 | 0.92 |
| 540 | 14.1 | 0.75 |

[1] Basis C in feed.

These data illustrate the effect of steam ratios and temperature on carbonyl formation employing the catalyst of the present invention. Operation at low steam ratios and higher temperatures serves to minimize the production of carbonyls.

EXAMPLE 3

The catalyst of Example 1 was given a 14-day period of a test, such as described in Example 2, with the cycle adjusted to the following sequences and times, and steam ratios of about 10 to 1 was carried out:

| | Minutes |
|---|---|
| Feed | 39 |
| Steam purge | 2 |
| Regeneration | 9 |
| Steam purge | 2 |
| Total | 52 |

This cycle provided a "process" period (defined as the time period in which hydrocarbon was fed to the reactor) of 75 percent of the total cycle. It also provided a relatively long period of feed time before regeneration.

Productivity was increased by 50 percent under these conditions and regeneration steam usage (per pound of butadiene) was reduced by a factor of 3 over the corresponding productivity and regeneration steam usage with the usual "process" period comprising 50% of the cycle time. The data provided in Table VII illustrate, as in Example 2, the operation of the catalyst at high temperature and at low steam rates, and shows that carbon laydown is essentially nil, carbonyls are very low and production of CO and $CO_2$ during the process portion of the cycle is nil. The conversion to products other than butadiene is substantially limited to methane, ethylene and propylene. The data below show the conversion of feed on a carbon basis (wt. percent) for the period. The feed space velocity was about 240 v./v./hr. and the temperature was 685° C.

TABLE VII.—CARBON BALANCE
[Weight percent carbon (basis C in feed)]

| Cycle | Steam ratio | Feed, v./v./hr. | $CH_4$ | $C_2H_6$ | $C_3H_6$ | Butenes | $C_4H_6$ | Carbon laydown | Carbonyls | Acetylene | CO and $CO_2$ |
|---|---|---|---|---|---|---|---|---|---|---|---|
| 2,535 | 10.2 | 251 | 0.87 | 0.42 | 2.64 | 72.30 | 23.31 | 0.03 | 0.26 | 0.17 | |
| 2,593 | 10.7 | 243 | 0.92 | 0.39 | 2.63 | 71.78 | 23.82 | 0.03 | 0.26 | 0.18 | |
| 2,679 | 10.9 | 246 | 0.87 | 0.30 | 2.65 | 72.73 | 23.00 | 0.01 | 0.27 | 0.16 | |
| 2,757 | 10.4 | 243 | 0.95 | 0.47 | 2.64 | 72.11 | 23.28 | 0.03 | 0.37 | 0.16 | |
| 2,817 | 9.7 | 254 | 0.90 | 0.37 | 2.49 | 73.18 | 23.64 | 0.02 | 0.29 | 0.11 | |
| 2,911 | 10.2 | 244 | 0.72 | 0.23 | 2.51 | 74.05 | 22.05 | 0.01 | 0.30 | 0.12 | |

The steam ratio (steam to hydrocarbon) for the period shown was about 10/1. During this period of cyclic operations the catalyst productivity was increased to about 2.44 lbs. of butadiene per pound of catalyst per day.

EXAMPLE 4

The catalyst powder of Example 1 was pelleted using "Sterotex" lubricant (2 percent). The lubricant was removed from the pellets by roasting in steam only (6000 v./v./hr.) at 650° C. for 1.5 hours. Samples from this batch of roasted pellets were used in each of the following runs, which show the low regeneration steam requirements of the catalyst. The tests were carried out in a small glass test furnace equipped with a pre-heating section and a 1 inch I.D. x 6.5 inch catalyst chamber. A 2 inch long bed of catalyst pellets (25 cc.) was placed in the central section. One hour cycles consisting of 28 minutes feed, 4 minutes nitrogen purge, 24 minutes regeneration and 4 minutes nitrogen purge were used in each of the three separate experiments. Temperature was held at 650° C. throughout the experiments.

During the process portion of the cycles, the butene space velocity was 300 v./v./hr. and the steam space velocity was held at 6000 v./v./hr. This provided a 20 to 1, steam to hydrocarbon ratio for all three experiments.

The air during the regeneration portion of the cycles was maintained at 800 v./v./hr. for each of the experiments. However, the steam space velocity during the regeneration was varied. In the first run, showing normal operation, the steam space velocity was 6000 v./v./hr. during all regeneration periods (Run A). In Run B, the 800 v./v./hr. of air used in the regeneration periods was first saturated with water vapor at 25° C. by passing the air through a bubbler held at 25° C. The calculated v./v./hr. of steam in 800 v./v./hr. of saturated air under these conditions is about 26 v./v./hr. In Run C, the regeneration period of all cycles (except as noted) was conducted with air (800 v./v./hr.) only.

The percent conversion and percent selectivity, previously defined, are listed in Table VIII for various cycles of the three runs.

TABLE VIII

| Run | Regeneration steam, v./v./hr. | Cycle No. | Process results | |
|---|---|---|---|---|
| | | | Percent conv. | Percent sel. |
| A (control) | 6,000 | 4 | 24.3 | 94.0 |
| B | 26 | 6 | 29.9 | 91.8 |
| | 26 | 10 | 30.9 | 92.1 |
| | 26 | 15 | 30.6 | 91.7 |
| | 26 | 19 | 29.4 | 94.1 |
| | 26 | 23 | 28.9 | 93.0 |
| C | 0 | 5 | 30.5 | 85.6 |
| | 0 | 6 | 28.2 | 81.9 |
| | 0 | [1]7 | 24.5 | 58.4 |
| | 0 | 8 | 29.1 | 53.3 |
| | 0 | [2]10 | 15.6 | 31.5 |
| | [3]6,000 | 11 | 27.8 | 21.6 |
| | 6,000 | 15 | 27.2 | 44.0 |

[1] Because of loss in selectivity, left on steam (6,000 v./v./hr.) and air (800 v./v./hr.) for two hours before cycle 8.
[2] Left on steam (6,000 v./v./hr.) and air (800 v./v./hr.) for six hours before cycle 11.
[3] Cycles 11 through 15 run at 6,000 v./v./hr. steam during regeneration.

These data show the deleterious effect of using air only (no steam) during regeneration, but the data also indicate that the catalyst has properties which allow a much reduced quantity of steam to be employed during the regeneration portion of the cycle without materially affecting catalytic activity.

EXAMPLE 5

The following example illustrates that temperature of precipitation within the range of about 0° to 40° C. has little or no effect on the activity of the catalyst.

Stock solutions of $SrCl_2$ containing 2.40 M/l. in $Sr^{++}$, $NiCl_2$ containing 3.13 M/l. in $Ni^{++}$ and $H_3PO_4$ containing 14.6 M/l. $PO_4^{\equiv}$ were used to make up a Sr-Ni-$PO_4$ feed solution as follows:

5.67 liters of $SrCl_2$ solution, 0.545 liter of $NiCl_2$ solution and 0.770 liter of $H_3PO_4$ solution were mixed together and diluted to a volume of 24.65 liters. The resulting dilute acid feed solution was .552 M/l. as $Sr^{++}$
0.069 M/l. as $Ni^{++}$ and
.456 M/l. as $PO_4^{\equiv}$ providing a Sr/Ni ratio of 8/1 and a total metal to phosphate ratio of 1.36/1. In each of the four runs below, 4.93 liters of this acid feed was used.

Each run was started with 2.72 liters of a solution containing 0.25 M/l. $NH_4Cl$. Dilute $NH_4OH$ (0.392 M/l.) was used for maintaining the pH at 7.0. The acid feed was admitted to the precipitator at a constant rate (about 1.05 liters/hr.) and the $NH_4OH$ solution was fed at a rate sufficient to maintain the pH.

A 10-gallon precipitator was jacketed, so that the temperature could be controlled by circulation of water through the jacket. The resulting phosphate slurry was allowed to settle overnight before recovery by the filtration and washing procedures outlined in Example 1. The wet cake was dried to constant weight at 120° C. The dried cake was crushed to pass through a 20 mesh screen. Pellets were made from the resulting powder by blending the powder with 3 percent by weight of graphite lubricant, pelletizing the material, and thereafter roasting the pellets in steam and air for about six hours at 650° C. The roasted pellets from each run were tested by dehydrogenating butylene at 650° C. employing a butylene feed space velocity of 300 v./v./hr., and a steam to butylene volume ratio of 20/1.

Table IX records the temperature of the precipitation, and the percent conversion of butylene feed, and the percent selectivity of the conversion to butadiene.

TABLE IX

| | Run A | Run B | Run C | Run D |
|---|---|---|---|---|
| Prec. temp., °C | 8–10 | 16–18 | 25 | 30–33 |
| Percent conv. of butylene feed | 28.3 | 26.1 | 27.6 | 28.0 |
| Percent sel. (to butadiene) | 97.1 | 97.2 | 97.1 | 97.0 |
| X-ray diffraction data (percent): | | | | |
| Dry powder: | | | | |
| Phase of Table II | 85 | 60 | 50 | 25 |
| β-Sr $NiPO_4$ | 15 | 40 | 50 | 75 |
| Roasted Catalyst: | | | | |
| β-Sr $NiPO_4$ | 75 | 100 | 90 | 75 |
| Sr $NiP_2O_7$ | 25 | | 10 | 25 |

EXAMPLE 6

About 1100 gallons of acid feed solution was prepared as in Example 1 and analyzed 0.058 M/l. in $Sr^{++}$, 0.013 M/l. in $Ni^{++}$, and 0.059 M/l. in $PO_4^{\equiv}$. This solution was employed in a precipitation at the rate of about 10 gallons per hour while maintaining the pH of the bulk contents at an average value of 6.47 by the concomitant introduction of anhydrous gaseous ammonia to the stirred reactor which originally contained water. The temperature was controlled at 21–22° C. After the original water had been displaced and the precipitation had reached a state of dynamic equilibrium, the overflow slurry had a 3-minute settle volume of 10–11 ml./100 ml. of slurry and a soluble alkalinity of 5.8–5.9 mls. Seven batches of twelve hours duration were collected consecutively. Each batch was treated by settling, filtration, washing to remove soluble salts, etc., dried and blended into a uniform powder as in Example 1. Analysis of the powder composite from the seven batches showed:

Percent

Sr _____ 39.85
Ni _____ 6.93
$PO_4$ _____ 43.64
Metal/$PO_4$—1.25

X-ray diffraction analysis showed only the pattern of the acidic strontium nickel phosphate of unknown structure. A portion of this composite powder was blended with a commercially available vegetable lubricant (Sterotex) such that the latter comprised 2% by weight of the total. This mixture was formed into pellets 3/16″ x 3/16″ in diameter which were afterwards roasted in a stream of steam at 650° C. for six hours to remove the lubricant.

X-ray diffraction analysis showed the presence of about 10–20% strontium nickel pyrophosphate and 80–90% β-strontium nickel phosphate in the pellets.

Subsequently, 150 cc. of the roasted pellets were placed in the central section of a one inch inside diameter by 48 inch long heated tube furnace and tested for dehydrogenation activity under the following conditions:

Butylene space velocity (STP) 150 v./v./hr.
Steam to butylene volume ratio 20/1.

One hour cycles, comprising 28 minutes feed, 2 minutes steam purge, 28 minutes regeneration with steam at 3000 v./v./hr. and air 400 v./v./hr., and 2 minutes steam purge were employed. The catalyst was heated to 600° C. The temperature was raised in fifteen degree increments after each three cycles of operation. Results were obtained by gas-liquid chromatography during the last cycle at each temperature. The temperatures, conversions, and selectivities are shown in the Table X below.

TABLE X

| Cycle | Temperature | Percent | |
|---|---|---|---|
| | | Conversion | Selectivity |
| 3 | 600 | 25.6 | 95.4 |
| 6 | 615 | 31.8 | 94.2 |
| 9 | 630 | 37.9 | 93.9 |

EXAMPLE 7

Various physical tests for measuring the strength and resistance to spalling of catalyst pellets are known in the art of catalyst production. A useful test which to a large extent provides a measure of the resistance to dusting is described as follows:

One hundred grams of the heat-treated (or roasted) catalyst pellets to be tested are placed in a mill consisting of a right circular steel cylinder having an inside diameter of about 10⅛ inches and a height of about 5 5/16 inches. A two inch plate protrudes toward the center from the circumference, thus forming a lifting flight for the pellets. The mill is covered, placed on its side and rolled on rollers for 30 minutes at about 55 r.p.m. The contents are then placed on a 20 mesh sieve and mechanically tamped for 10 minutes. The material remaining on this screen is weighed. The spalling resistance can be defined as the weight of catalyst remaining on the sieve after the above treatment, divided by the weight of pellets charged to the attrition mill, expressed as a percent.

Pellets 3/16 inch long by 3/16 inch in diameter were made from the composite powder of Example 1 and had 2% graphite added as a lubricant. Table XI below shows the average side crushing strength of the raw pellets, the average crushing strength of the roasted pellets (six hours in steam and air at 650° C.) and the average side crushing strength of the pellets after treatment for 36 hours in steam at 700° C., as described above. Also, the "spalling" resistance after the accelerated aging test (roasting at 700° C. for 36 hours in steam flowing at 6000 v./v./hr.) is also given.

TABLE XI

|  | Sample A (2% graphite) |
|---|---|
| Average side crushing strength (lbs.): | |
| Raw pellets | 21.2 |
| Roasted pellets | 30.1 |
| Accelerated usage | 19.4 |
| Spalling Resistance: | |
| Accelerated usage, 92.8%. | |

This example illustrates the unexpected property of the catalysts of this invention which manifests itself in the increase in side crushing strength after the normal roast procedure to remove lubricant. The side crushing strength remains in a practical, useful range even after the accelerated aging treatment whereas the resistance to dusting after treatment is superior.

EXAMPLE 8

The following example illustrates the use of the catalyst of the present invention in a process for dehydrogenating 3-methyl-1-butene to isoprene. The roasted catalyst of Example 1 was employed. A catalyst bed of 150 cc. was placed in a 1 inch tube furnace equipped with heating controls, hydrocarbon and steam inlets, condensers and product measuring and analyzing devices. The test was operated cyclically using 15 minutes for feed, 2 minutes for steam purge, 11 minutes for regeneration with steam and air and 2 minutes for steam purge for a total cycle time of 30 minutes. During the feed periods 3-methyl-1-butene (99 mole percent purity) was metered to the feed input of the reactor at a space velocity of 227 volumes (S.T.P.) per volume of catalyst per hour. Steam was introduced at 3100 v./v./hr. providing a steam to hydrocarbon volume ratio of 13.7 to 1. During purge and regeneration the steam rate was maintained at 3100 v./v./hr. Air during regeneration was admitted at a space velocity of 800 v./v./hr.

During the feed period of three consecutive cycles the process gas from the reactor was admitted to a condenser operated at about 0° C. The steam and hydrocarbon products were condensed and separated into two layers. The condenser was backed by a cold trap chilled to −78° C. which served to condense out low boiling hydrocarbon product. Non-condensible gases, e.g. $H_2$, CO, etc., were passed through a sampling system and finally vented through a meter.

The aqueous layer was analyzed by gas-liquid chromatography analysis for carbonyls. The main portion of the hydrocarbon product was chilled to −78° C. and blended with the contents of the cold trap, after which a liquid sample was analyzed by gas-liquid chromatography. The percent conversion is defined as the "moles of 3-methyl-1-butene consumed×100 divided by the moles of 3-methyl-1-butene in the feed." The percent selectivity is defined as the "moles of isoprene (2-methyl-1,3-butadiene) produced×100 divided by the moles of 3-methyl-1-butene consumed." The non-condensible gases were continuously sampled and analyzed by gas liquid chromatography. Carbon laydown was determined by absorption of carbon dioxide in a U-type weighing tube containing 50 percent Ascarite–50 percent alumina and converted to weight percent carbon, basis carbon in the feed.

The various products were converted to a weight percent carbon basis based on the weight of carbon in the feed. The following product analysis resulted from cycles 91–93 during which the temperature was controlled at 610° C.

|  | Percent |
|---|---|
| Conversion | 39.08 |
| Selectivity | 76.03 |

| Carbon balance: | Wt. percent C [1] |
|---|---|
| Isoprene | 29.71 |
| Methyl butenes | 60.92 |
| CO | 1.19 |
| $CO_2$ | 0.17 |
| $CH_4$ | 0.26 |
| Ethylene | 0.77 |
| Propylene | 0.81 |
| Isobutene | 0.08 |
| Butenes and butadiene | 2.66 |
| n-Pentanes and n-pentenes | 1.78 |
| Piperylene (cis and trans) | 0.97 |
| Carbon laydown | 0.14 |
| Carbonyls | 0.48 |
| Total | 99.94 |

[1] Basic C in feed.

EXAMPLE 9

An acid feed solution was prepared from strontium nitrate, nickel chloride, phosphoric acid and water. The solution analyzed as follows: 0.2521 mole $Sr^{++}$ per liter 0.0488 mole of $Ni^{++}$ per liter and 0.2448 mole of $PO_4^{\equiv}$ per liter. This solution was introduced at the rate of about 8.64 gallons per hour into a stirred precipitating vessel (24 gallon capacity) containing water. Simultaneously, gaseous ammonia was introduced at a rate such that the bulk contents were maintained at a pH of approximately 6.6 and temperature of precipitator controlled at 25°–28° C. After the original water had been displaced and the precipitation had reached a state of dynamic equilibrium, the overflow slurry had a 3-minute settle volume of 18–24 ml./100 ml. of slurry and a soluble alkalinity (defined as the mls. of N/10 HCl required per 100 ml. of filtered supernatant liquid to reach the modified methyl orange end point) of 8.1 to 10.8 mls. The SrNi phosphate material was allowed to settle before decantation of the clear supernatant liquid layer and filtration of the dense slurry. The filter cake was washed with water to remove soluble salts. The washed cake was dried at 150° C. for 4 hours. The resulting material had the following analysis:

|  | Percent |
|---|---|
| Sr | 37.24 |
| Ni | 7.59 |
| $PO_4$ | 48.87 |
| Sr/Ni—3.29 | |
| Metal/$PO_4$—1.11 | |

The X-ray pattern showed that the only crystalline phase present was the acidic SrNi phosphate of unknown structure. After a six-hour roast at 650° C. in steam (3725 v./v./hr.) and air, (400 v./v./hr.), the material was substantially crystalline and consisted of strontium nickel pyrophosphate as shown by its X-ray diffraction pattern. When tested, the catalyst demonstrated dehydrogenation activity with butene.

EXAMPLE 10

One thousand ninety eight (1,098) gallons of 0.085 molar strontium hydroxide aqueous slurry was prepared using 215.5 pounds 95% $Sr(OH)_2 \cdot 8H_2O$. A second feed consisting of 800 gallons, containing 53.5 lbs.

$$Ni(NO_3)_2 \cdot 6H_2O$$

71.9 pounds $H_3PO_4$ and 12.8 lbs. $NH_4OH$ was prepared with water as the solvent. The second feed analyzed .029 molar for $Ni^{++}$, 0.057 molar $NH_4^+$ and 0.115 molar $PO_4^\equiv$.

The strontium hydroxide slurry was fed into a water-filled, agitated, reactor at the rate of 9.5 gallons per hour. The second feed was introduced at a rate of 6.2 gallons per hour. Near its top, the reactor had an overflow line through which a slurry of strontium nickel phosphate was removed and filtered.

The pH of the mixture in the reactor was maintained at 7.9–8.0 and the temperature was held between 24 and 28° C.

During 78 hours, eight collections of strontium nickel phosphate were made. Each sample of catalyst was washed, dewatered, and dried at 140° C. The samples were then blended and further dried, to constant weight, at 175° C. The final product contained 44.66% by weight Sr, 6.54% Ni, and 41.48% phosphate. The mol ratio of Sr to Ni was 4.78 and the metal to phosphate ratio was 1.47.

A portion of the dried catalyst was blended with 3% by weight of graphite and pressed into cylindrical pellets ³⁄₁₆ inch long and ³⁄₁₆ inch in diameter.

The pellets were roasted, as described in Example 1, and then tested for dehydrogenating activity of n-butylene to butadiene in the test defined above. X-ray diffraction data showed only β-strontium nickel phosphate as the crystalline phase.

In the 10th cycle of this test, the conversion of butylene per pass at 650° C. was 38.5% and the selectively to butadiene was 95.4%.

EXAMPLE 11

A strontium hydroxide solution was prepared in water. It contained 0.067 mole in $Sr(OH)_2$ per liter.

A second aqueous solution was prepared from $Ni(NO_3)_2$, $H_3PO_4$ and $NH_4OH$, containing .054 mole liter $Ni^{++}$, 0.2466 mole/liter $PO_4^\equiv$ and 0.090 mole /liter $NH_3$.

The agitator of a ten gallon stainless steel precipitator was covered with 7.4 liters of water and the $Sr(OH)_2$ solution was admitted through a downcomer at a rate of 6.75 liters/hour. The second aqueous solution, entering the tank through a second downcomer, was fed at a rate such that the bulk pH of precipitator was maintained at about 8.8. The volume of the precipitator was maintained at the level of 11 liters by pumping off the slurry to a settling tank. Temperature was maintained at 25° C.

After 7 hours of operation, 47.2 liters of the $Sr(OH)_2$ solution and 10.9 liters of the solution containing $NH_4$, $Ni^{++}$, and $H_3PO_4$ had been used. The remaining contents of the precipitator were pumped to the settling tank and the slurry allowed to settle overnight.

The clears were then decanted and the phosphate sludge placed on a bed filter to remove excess mother liquor. The filter cake was washed free of adhering mother liquor by reslurrying it in four liters of water and refiltering. The filter cake was dried to constant weight at 175° C. This procedure produced 501 g. of light tan material analyzing by weight, strontium 48.45%, nickel 5.90%, and phosphate 43.50%. Calculation shows this material to have a mole ratio of Sr/Ni of 5.5 and a metal/phosphate ratio of 1.43. X-ray analysis showed the pattern of β-$(Sr,Ni)_3(PO_4)_2$. A sample of the dried material was ground to pass a 12-mesh sieve, blended with graphite (3 parts graphite to 97 parts dry powder) and formed into pellets (³⁄₁₆ inch in diameter by ³⁄₁₆ inch length).

These were roasted and tested for butene dehydrogenation activity by procedures described above, and showed 40.7% conversion of butene at a selectivity to butadiene of 95.7%. The roasted pellets showed only β-strontium nickel phosphate in the X-ray diffraction pattern.

EXAMPLE 12

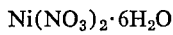

A strontium hydroxide slurry was prepared by slurrying 5 moles of $Sr(OH)_2 \cdot 8H_2O$ in 32.2 liters of water. The slurry contained the equivalent of 0.155 moles of $Sr(OH)_2$ per liter. A total of 19 liters of an acid feed solution containing $Ni(NO_3)_2 \cdot 6H_2O$ (97.78%), $H_3PO_4$ and $NH_4OH$ was prepared. The analysis of the solution indicated that it contained .059 mole/liter $Ni^{++}$, 0.237 mole/liter $PO_4$ and 0.113 mole/liter $NH_3$.

The agitator of a ten gallon stainless steel precipitator was covered with 7.6 liters of water and the $Sr(OH)_2$ slurry was admitted through a downcomer at a rate of 4.4 liters/hour. The above acid feed solution, entering the tank through a second downcomer, was fed at a rate such that the bulk pH of the precipitator was maintained at about 6.3. The volume of the precipitator was maintained at the level of 11 liters by pumping off the slurry to a settling tank. Temperature was maintained at 25° C. After 7.25 hours of operation, 32.2 liters of the $Sr(OH)_2$ slurry and 19.0 liters of the acid feed solution had been used. The remaining content of this precipitator were pumped to the settling tank and the slurry allowed to settle overnight.

The clears were then decanted and the phosphate sludge placed on a bed filter to remove excess mother liquor. The filter cake was washed free of adhering mother liquor by reslurrying it in 6 gallons of water and refiltering. The filter cake was dried to constant weight at 175° C. This procedure produced 636 g. of light tan material having, by weight, strontium 41.8%, nickel 6.85% and phosphate 44.7%. Calculation shows this material to have a mole ratio of Sr/Ni of 3.66 and a metal/phosphate ratio of 1.27. (The X-ray pattern of this material showed it to be the defined unknown phase.)

A sample of the dried material was ground to pass a 12-mesh sieve, blended with graphite (98 parts dry powder to 2 parts graphite) and formed into pellets ³⁄₁₆ inch diameter by ³⁄₁₆ inch length. These were roasted in steam and air and tested for butene dehydrogenation activity by the procedure described and showed 37.9% conversion and 95.5% selectivity.

The X-ray pattern of the roasted and tested material showed about 10% strontium nickel pyrophosphate and about 90% β-strontium nickel phosphate.

EXAMPLE 13

A water solution of $Sr(OH)_2$ containing 0.063 mole per liter of the hydroxide and an aqueous nickel-acid feed containing $Ni(NO_3)_2$ and $H_3PO_4$, analyzing 0.061 mole nickel per liter, and 0.246 mole phosphate per liter were used.

The agitator of a ten gallon stainless steel precipitator was covered with 7.4 liters of water and $Sr(OH)_2$ solution was admitted through a downcomer at a rate of 15.3 liters/hour. The $Ni-H_3PO_4$ solution, entering the tank through a second downcomer, was fed at a rate such that the bulk pH of precipitator was maintained at about 6.4.

The volume of the precipitator was maintained at the level of 19.6 liters by pumping off the slurry to a settling tank. Temperature was maintained at 25° C.

After 4.7 hours of operation, 71.7 liters of $Sr(OH)_2$ solution and 16.5 liters of the $Ni-H_3PO_4$ containing solution had been used. The remaining contents of the precipitator were pumped to the settling tank and the slurry allowed to settle overnight.

The clears were then decanted and the sludge placed on a bed filter to remove excess mother liquor.

The filter cake was washed free of adhering mother liquor by reslurrying it in 8.7 liters of water and refiltering. The filter cake was dried to constant weight at 175° C. This procedure produced 674 g. of light tan material having, by weight, strontium 41.98%, nickel 7.89%, and phosphate 45.92%. Calculation shows this material to have a mole ratio of Sr/Ni of 3.57 and a metal/phosphate ratio of 1.27. X-ray analysis of the powder showed only the unknown precursor crystalline phase defined in Table II.

A sample of the dried material was ground to pass a 20-mesh sieve, blended with graphite (3 parts graphite to 97 parts dry powder) and formed into pellets (3/16 inch diameter by 3/16 inch length).

These were roasted and tested for butene dehydrogenation activity by procedures described and showed 40.3% conversion of butene at a selectivity to butadiene of 95.3%.

X-ray analysis of the tested catalyst showed 5–10% strontium nickel pyrophosphate and the balance β-strontium nickel pyrophosphate.

EXAMPLE 14

An aqueous $Sr(OH)_2$ solution containing 0.029 mole of $Sr(OH)_2$ per liter was used as one feed ingredient and an aqueous solution of $NiCl_2$, $(NH_4)_2HPO_4$ and $H_3PO_4$ containing 0.031 mole nickel per liter, 0.060 mole $NH_3$ per liter and 0.126 mole phosphate per liter was used as a second feed solution.

The agitator of a ten gallon stainless steel precipitator was covered with 7.4 liters of water and the $Sr(OH)_2$ solution was admitted through a downcomer at a rate of 15.3 liters/hour. The $NiCl_2-H_3PO_4$ solution, entering the tank through a second downcomer, was fed at a rate such that the bulk pH of precipitator was maintained at about 6.4. The volume of the precipitator was maintained at a level of 19.6 liters by pumping off the slurry to a settling tank. Temperature was maintained at 25° C. After 6.5 hours of operation, 99.43 liters of $Sr(OH)_2$ solution and 32.89 liters of $NiCl_2-H_3PO_4$ solution had been used. The remaining contents of the precipitator were pumped to the settling tank and the slurry allowed to settle overnight.

The clears were then decanted and the sludge placed on a bed filter to remove excess mother liquor. The filter cake was washed free of adhering mother liquor by reslurrying it in 8.7 liters of water and refiltering. The filter cake was dried to constant weight at 175° C. This procedure produced 431 g. of light tan material having, by weight, strontium 38.49%, nickel 10.90%, and phosphate 46.58%. Calculation shows this material to have a mole ratio of Sr/Ni of 2.36 and a metal/phosphate ratio of 1.28. X-ray analysis of the powder showed the pattern of the acidic strontium nickel phosphate of unknown structure as the only crystalline phase.

A sample of the dried material was ground to pass a 20-mesh sieve, blended with graphite (3 parts graphite to 97 parts dry powder) and formed into pellets (3/16 inch diameter by 3/16 inch length). These were roasted and tested for butene dehydrogenation activity by the procedure described and showed 37.9% conversion of butene at a selectivity to butadiene of 95.2%.

X-ray analysis of the tested catalyst showed less than 5% strontium nickel pyrophosphate and the balance β-strontium nickel phosphate.

EXAMPLE 15

A solution containing 0.030 mole $Sr(OH)_2$ per liter was prepared by dissolving $Sr(OH)_2 \cdot 8H_2O$ in water.

An aqueous acid feed solution was prepared using a mixture of $NaNiPO_4 \cdot 7H_2O$ and $Ni_3(PO_4)_2 \cdot 8H_2O$ both of which were dissolved in dilute $H_3PO_4$ to provide a solution containing 0.0486 mole nickel, 0.0159 mole of sodium, and 0.2435 mole phosphate per liter.

The acid feed solution was introduced through a downcomer into a stirred precipitating vessel at a ratio of 8.44 liters per hour.

The $Sr(OH)_2$ solution, entering the vessel through a second downcomer, was fed at a rate such that the bulk pH of the precipitator was maintained at about 5.99 to 6.02. The volume of the precipitator was maintained at 24 gallons by means of an overflow pipe which led to a settling tank. Temperature was controlled at 26.8–27.3° C.

After a 4 hour period to allow the precipitator to reach dynamic equilibrium, the overflow slurry was collected separately for 6 hours. During this time the phosphate slurry had a 3 minute settle volume of 77–80 ml. per 100 ml. of slurry, and a soluble alkalinity (defined as the mls. of N/10 HCl required per 100 ml. of filtrate to reach the modified methyl orange end-point) of 3.80–3.95 mls. At the end of 6 hours the collection was filtered and washed to remove any soluble salts.

The dewatered filter cake was dried at 178° C. to obtain approximately 1.6 lbs. of solids. This material analyzed by weight, strontium 34.00%, nickel 11.62%, and phosphate 43.55%. By calculation, the Sr/Ni mole ratio was 1.96 and the metal/phosphate mole ratio was 1.28. X-ray analysis showed a pattern typical of poorly crystalline α-(Sr, Ni)HPO₄.

A sample of the dried material was ground to pass a 12-mesh sieve, blended with graphite (3 parts graphite to 100 parts dry powder) and formed into pellets (3/16 inch diameter by 3/16 inch length). These were roasted in steam and air at 650° C. for 6 hours and tested for butene dehydrogenation activity by the procedure described herein. The catalyst showed 25.5% conversion of butene at a selectivity to butadiene of 95.5% in the 10th cycle.

The tested catalyst had an X-ray diffraction pattern which is predominantly strontium nickel pyrophosphate. About 5% of β-strontium nicked phosphate was also present.

The catalyst of the present invention can also be successfully employed in a continuous process which comprises passing a gaseous hydrocarbon, selected from the group consisting of aliphatic, alicyclic and phenylaliphatic hydrocarbons having not more than one olefinic double bond and having at least two adjacent saturated aliphatic carbon atoms each bearing at least one hydrogen atom with steam, oxygen or an oxygen-containing gas (air) in the presence of bromine or a bromine-yielding compound (the term bromine as used hereinafter shall mean elemental bromine or bromine from a bromine-yielding source) into contact with a strontium nickel phosphate catalyst which may have from 0.2 to 10 percent chromic oxide dispersed throughout at a temperature of from 400° to about 700° C. for a period of time sufficient to effect a dehydrogenation of a substantial quantity of the hydrocarbon to its corresponding diene. The result is achieved by maintaining the hydrocarbon, steam, oxygen and bromine in a molar ratio of from 1 to 1 to .25 to 0.002, respectively, through the ratio of 1 to 40 to 3 to 0.30, respectively. The relative amount of bromine is preferably between about 1 to 10 mole percent based on hydrocarbon. The bromine, which is required for the successful operation of the continuous process, must be introduced as free bromine or as a compound capable of decomposition to yield free bromine, e.g. organic bromine compounds or inorganic bromine compounds such as for example, butyl bromide, $NH_4Br$ and HBr, under the conditions of reaction. The process equipment is essentially that employed in present day butadiene plants except that only one reactor is now necessary per train. Having described in generic terms a continuous process employing the catalyst of the present invention the following description with reference to the flow diagram is set forth.

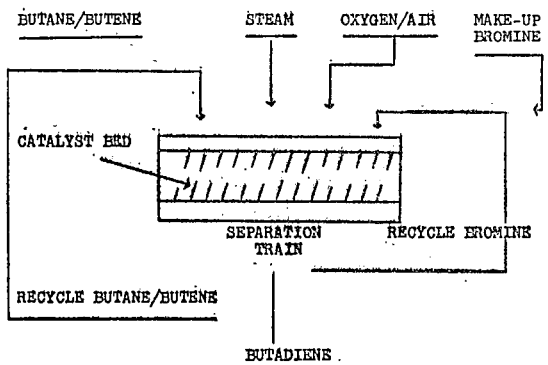

Butane, butene, or a mixture thereof is fed along with steam and oxygen or air to a reactor containing a granular or pellet form of a strontium nickel phosphate catalyst, preheated by sweeping with steam to the desired reaction temperature, that is, between 400° and 700° C. and preferably between 450° and 650° C. The preferred manner of operation is hereafter described although it is to be understood wide variations in technique can be employed without substantial loss of the advantage. The hydrocarbon containing gas is passed into admixture with steam which has been superheated to a temperature sufficient so that the resultant mixture is at the desired temperature and under a slight pressure through the bed of catalyst. However, the heat may be supplied in other ways, for example, using preheaters, or by externally heating the catalyst chamber itself.

The steam may be used in amounts sufficient to moderate the temperature rise of the reactants and products through the reaction zone. Generally, 10 to 20 volumes of steam per volume of hydrocarbon are sufficient.

The bromine required to obtain efficient and successful operation of the present process is initially introduced into the catalyst zone either as a decomposable organic bromine compound or with the gaseous feed as elemental bromine or hydrogen bromide. Once the bromine required for the particular operation is in the system only periodic introductions are required and these to supply the very small losses of bromine from the system.

It is to be clearly understood that the greatest economic advantages are obtained when the process is operated in a continuous manner. However, it is also to be understood that even when operated in a noncontinuous manner certain economics can still be realized and conversions and selectivities per pass remain high although it is apparent overall efficiencies will be lower by at least the services used during regeneration or holding without feed.

The amount of oxygen employed in successful operations of the present invention ranges from about 50 to about 400 percent of that theoretically capable of reacting with the theoretical hydrogen to be removed to obtain the desired product. Preferably, however, the oxygen is employed in from between about 120 to 190 percent of that stoichiometrically required to produce complete conversion to the desired product.

The space velocity of the reactants or reactant hydrocarbon can vary from about 50 to 500 volumes of hydrocarbon per volume of catalyst per hour. Preferably the space velocity of the reactant or reactants varies from about 100 to about 300 v./v./hr.

EXAMPLE 16

This example illustrates the use of the catalyst in the continuous dehydrogenation process employing steam, butene, air and bromine as the reactants. A Vycor glass tube 1¼ inches I.D. x 24 inches long was employed as a reactor. The roasted catalyst pellets from Example 1 were placed in the tube on top of a six inch bed of crushed 4-8 mesh porcelain Raschig rings. A 150 ml. sample formed an eight inch bed. Nine inches of crushed Raschig rings were placed on top of the catalyst. The temperature of the reactor was controlled by three external electric heating sections.

The catalyst was operated on feed conditions continuously for 336 hours over a range of temperatures from 595° C. to 620° C. at butene space velocities held nominally at 150 v./v./hr. The hydrocarbon product was analyzed by gas-liquid chromatography and the results are expressed on a hydrogen free, $C_4$ mole percent basis. Percent conversion is defined as moles of butene reacted per mole of butene in the feed expressed as percent. Percent selectivity is moles of butadiene produced per mole of butene reacted, expressed as percent. In the mole ratios of reactants shown in the data the ratio of $O_2$ to butene is given although air was actually used. Space velocities of the reactants were calculated on the volumes of gas corrected to STP per volume of catalyst bed (150 ml.) per hour. The reactants were admitted to the top of the reactor by means of a glass header. Elemental bromine was dissolved in water to form a solution having the desired mole ratio. This solution was pumped as a liquid to a preheater operating at 400° C. The mixed vapors of bromine and steam were then admitted to the top of the glass header. A second inlet in the header, positioned downstream and discharging along the axis, admitted air in the desired quantity. A third inlet, downstream from the first two and discharging in a downstream direction along the axis, admitted butene-2.

Several representative results are given in Table XII at the conditions of temperature, butene space velocity and mole ratio of reactants listed.

TABLE XII

| | Temp. | Butene, v./v./hr. | Mole ratio | | | | Percent | | Lbs. butadiene, lb. cat./day |
| --- | --- | --- | --- | --- | --- | --- | --- | --- | --- |
| | | | $C_4$ | Steam | $O_2$ | $Br_2$ | C | S | |
| (a) | 595 | 155 | 1 | 19.8 | 0.9 | 0.022 | 59.5 | 89.2 | 4.27 |
| (b) | 605 | 150 | 1 | 19.9 | 0.6 | 0.024 | 54.5 | 89.4 | 3.89 |
| (c) | 620 | 145 | 1 | 21.0 | 0.9 | 0.025 | 65.2 | 87.4 | 4.51 |
| (d) | 620 | 153 | 1 | 20.4 | 0.6 | 0.024 | 51.8 | 88.7 | 3.82 |
| (e) | 620 | 152 | 1 | 20.4 | 0.6 | 0.024 | 49.0 | 86.4 | 3.61 |
| (f) | 620 | 149 | 1 | 14.6 | 0.9 | 0.018 | 59.8 | 84.1 | 3.98 |
| (g) | 620 | 154 | 1 | 10.2 | 0.9 | 0.012 | 54.4 | 79.5 | 3.50 |

EXAMPLE 17

In this example the dehydrogenation of butane to a mixture of butadiene and butene by procedural steps described in Example 16, in which air and a bromine source are employed as reactants in addition to the steam and hydrocarbon.

The reactor was a high silica glass tube 4 feet long, 19 mm. internal diameter, fitted with an axial thermowell. The reactor was filled with 4½ inches of crushed Raschig rings for supporting the catalyst, a catalyst bed of 37 inches of ³⁄₁₆ x ³⁄₁₆ inch pellets and a pre-heat zone of 5 inches of crushed Raschig rings.

β-Strontium nickel phosphate with and without $Cr_2O_3$ was tested. The catalyst was made by a procedure similar to that described in Example 11 in which $Sr(OH)_2$ was used as a solution and the bulk pH was maintained at about 8.8.

The catalyst was roasted to remove graphite lubricant and then heated to 675° C. in the presence of steam for 24 hours before use. After roasting, X-ray diffraction analysis showed that the catalyst was 100% β-strontium nickel phosphate.

The source of bromine in each instance was an aqueous solution of HBr of various concentrations to supply the requisite Br and steam. Air was the source of oxygen. The HBr solution was heatd to about 500° C. and the butane and air were metered separately and mixed with the steam-HBr in a heated glass manifold. The temperature to the reactor preheat zone was about 200° C. The reactor was heated to the desired temperature by means of electric resistance wires.

The total reactor product was passed into a water cooled tube to condense the steam and organic halides. Gaseous products passed through a tube of Drierite to remove traces of moisture. The dry gases were analyzed by gas chromatography.

The space velocity of the reactants is the volume at 0° C. and 760 mm., per volume of catalyst, per hour.

The reaction pressure was slightly above atmospheric.

The selectivity and yield are based on the combined amounts of butadiene and butene formed. Tabulated below are summaries of data obtained in a series of runs.

The catalyst used for the runs in Table XIII did not contain $Cr_2O_3$, and that used for the runs in Table XIV was the same catalyst to which 2% $Cr_2O_3$ are added.

TABLE XIII

| Run No. | V./v./hr. nC₄H₁₀ | Br₂ | O₂ | Moles steam/HC | Temp., ° C., outlet | C₄H₆/C₄H₈ | Percent C | S | Y |
|---|---|---|---|---|---|---|---|---|---|
| 1 | 99.2 | 5.1 | 82.6 | 19.5 | 578 | 2.7 | 35.1 | 93.4 | 32.7 |
| 2 | 96.3 | 4.6 | 85.9 | 18.3 | 597 | 3.5 | 40.9 | 91.8 | 37.6 |
| 3 | 98.3 | 4.9 | 83.4 | 18.9 | 601 | 3.3 | 42.7 | 91.6 | 39.1 |
| 4 | 95.6 | 14.0 | 114 | 20.1 | 609 | 4.2 | 51.9 | 88.0 | 45.7 |
| 5 | 97.2 | 14.0 | 116 | 19.7 | 614 | 6.5 | 64.9 | 86.1 | 55.9 |
| 6 | 95.3 | 14.0 | 116 | 20.0 | 615 | 5.9 | 63.7 | 86.3 | 55.0 |
| 7 | 95.3 | 14.0 | 113 | 20.1 | 624 | 5.3 | 66.0 | 86.0 | 56.7 |
| 8 | 96.6 | 13.9 | 115 | 19.7 | 625 | 6.4 | 67.0 | 85.5 | 57.3 |
| 9 | 95.8 | 13.9 | 116 | 20.0 | 630 | 10.8 | 77.5 | 84.6 | 65.5 |
| 10 | 95.8 | 14.0 | 115 | 20.0 | 630 | 8.8 | 77.3 | 84.9 | 65.7 |
| 11 | 95.0 | 14.0 | 126 | 20.1 | 642 | 11.1 | 80.7 | 83.6 | 67.5 |
| 12 | 96.1 | 14.0 | 126 | 20.0 | 640 | 11.2 | 80.1 | 82.3 | 66.0 |

NOTE.—In the above and two following tables, C=conversion; S=selectivity; Y=yield.

TABLE XIV

| Run No. | V./v./hr. nC₄H₁₀ | B₁₂ | O₂ | Moles steam/HC | Temp., ° C., outlet | C₄H₆/C₄H₈ | Percent C | S | Y |
|---|---|---|---|---|---|---|---|---|---|
| 1 | 95.9 | 4.9 | 84.9 | 20.0 | 582 | 2.4 | 35.0 | 93.2 | 32.6 |
| 2 | 95.9 | 5.1 | 85.0 | 20.6 | 605 | 2.8 | 41.3 | 90.3 | 37.3 |
| 3 | 95.8 | 13.9 | 111 | 18.0 | 615 | 5.2 | 58.6 | 85.9 | 50.1 |
| 4 | 95.9 | 13.9 | 116 | 19.8 | 630 | 7.9 | 73.0 | 83.7 | 61.1 |
| 5 | 97.0 | 14.0 | 127 | 19.8 | 641 | 10.9 | 79.0 | 82.1 | 64.9 |
| 9 | 95.6 | 4.9 | 84.6 | 20.0 | 604 | 3.4 | 44.6 | 91.0 | 40.5 |

EXAMPLE 18

The catalysts used for the runs of Example 17 were also employed for dehydrogenating butene, by the procedure in which the butene oxygen and bromine were added as reactants. An aqueous solution of HBr was employed to provide both steam and a source of bromine. Air was the oxygen containing gas. The percent conversion indicates the butene reacted and percent selectivity represents the portion of reacted butene converted to butadiene. Yield is calculated in the usual manner. The apparatus described for Example 16 was employed in these runs. Tabulated below are the data obtained. The first three runs were made with catalyst containing no added $Cr_2O_3$ and runs 4–6 were made with catalyst containing 2 parts $Cr_2O_3$ and 98 parts strontium nickel phosphate.

TABLE XV

| Run No. | V./v./hr. nC₄H₈ | Br₂ | O₂ | Moles steam/ mol C₄H₈ | Temp., ° C., outlet | C₄H₆/C₄H₈ | Percent C | S | Y |
|---|---|---|---|---|---|---|---|---|---|
| 1 | 94.7 | 5.0 | 84.0 | 20 | 515 | 1.1 | 55.7 | 88.4 | 49.3 |
| 2 | 95.8 | 5.0 | 83.9 | 20 | 499 | .73 | 45.2 | 88.8 | 39.9 |
| 3 | 94.4 | 13.8 | 115 | 18.9 | 534 | 4.3 | 83.3 | 85.5 | 71.2 |
| 4 | 97.1 | 14.1 | 118 | 19.9 | 537 | 3.9 | 82.1 | 85.4 | 70.1 |
| 5 | 94.5 | 5.0 | 84.2 | 20.3 | 515 | 1.2 | 58.0 | 88.9 | 51.6 |
| 6 | 95.1 | 5.0 | 84.4 | 20.1 | 490 | .79 | 47.5 | 87.4 | 41.5 |

We claim:

1. A strontium nickel phosphate material comprising phosphate chemically combined with strontium and nickel in the relative proportions of from 2 to 20 atoms of strontium per atom of nickel and from 1 to 2 atoms of metals per atom of phosphorus, said strontium nickel phosphate containing β-strontium nickel phosphate, strontium nickel pyrophosphate or mixtures thereof.

2. The material of claim 1 in which the β-strontium nickel phosphate constitutes 50 to 98% by weight and strontium nickel pyrophosphate constitutes 2–50% by weight of the crystalline strontium nickel phosphates in said material.

3. The material of claim 1 in which β-strontium nickel phosphate is substantially the sole strontium nickel phosphate in the composition.

4. The material of claim 1 in which β-strontium nickel phosphate constitutes 70–100% by weight of the Sr. Nn, and PO₄ containing constituents.

5. The material in claim 1 in which strontium nickel pyrophosphate is substantially the sole strontium nickel phosphate in the composition.

6. The product of claim 1 when pulverized and thereafter pressed into pellets.

7. The product of claim 5 when mixed with an oxidizable lubricant prior to pressing into pellets.

8. The product of claim 6 when mixed with from 0.2 to 10 percent by weight of chromic oxide prior to pelletizing.

9. The product of claim 2 which has been pulverized and thereafter pressed into pellets.

10. The product of claim 2 which has been mixed with an oxidizable lubricant prior to pressing into pellets.

11. The strontium nickel phosphate material defined by the X-ray diffraction pattern of Table II hereof.

12. The strontium nickel phosphate material defined by the X-ray diffraction pattern of Table II hereof in admixture with 15–75% by weight based on the weight of the mixture of β-strontium nickel phosphate.

13. A method of preparing strontium nickel phosphate comprising mixing a water soluble salt of strontium or strontium hydroxide, a water soluble nickel salt and phosphoric acid in an aqueous medium at a pH of 5.0 to 9.5, with the proviso that, if a water soluble strontium salt is employed as a reactant, ammonia or a water soluble amine be employed to control the bulk pH of the reaction medium.

14. The method of producing a dehydrogenation catalyst which comprises mixing an aqueous solution of a soluble strontium salt and a soluble nickel salt, in proportions corresponding to between 2 and 20 atoms of strontium per atom of nickel, with an aqueous solution of a soluble ortho-phosphate while maintaining the resultant mixture at least below a pH of about 7.3 whereby a phosphate material consisting essentially of phosphate radicals chemically combined with strontium and nickel is formed and precipitated, and separating and drying the precipitate.

15. The method of claim 14 wherein said precipitation is accomplished by admixing said solution with an aqueous solution of an alkaline reagent, the latter being present in amount sufficient to give the resultant mixture a pH value of below about 7.3.

16. The method of claim 15 wherein said alkaline reagent is ammonium hydroxide.

17. The method of claim 15 wherein said alkaline reagent is ammonia.

18. A method of producing a strontium nickel phosphate dehydrogenation catalyst comprising mixing an aqueous solution of a nickel salt in ortho phosphoric acid with a solution or slurry of strontium hydroxide at a bulk pH of 5.8 to about 9.2 in a proportion of from 2 to 20 atoms of strontium per atom of nickel and a total metal to phosphate ratio of 1:2 atoms of metal per phosphate group.

19. The method of claim 18 in which the strontium to nickel ranges from 2 to 6 atoms of strontium per atom of nickel and the metal.

20. The method of claim 19 in which the strontium hydroxide is an aqueous slurry.

21. The method of claim 19 in which the strontium hydroxide is in solution in water.

22. The method of claim 19 in which the nickel chloride is dissolved in aqueous phosphoric acid.

23. The method of claim 19 in which nickel nitrate is dissolved in aqueous phosphoric acid solution.

24. The method of claim 19 in which metallic nickel or an oxide thereof is dissolved in aqueous phosphoric acids.

25. In a method for dehydrogenating alkanes to alkenes and diolefins, alkenes to diolefins or alkylaromatic hydrocarbons to β-alkenylaromatic hydrocarbons by passing the appropriate hydrocarbon through a heated zone in the presence of steam and a dehydrogenation catalyst, the improvement of employing as the catalyst the strontium nickel phosphate material of claim 1.

26. In a method for dehydrogenating alkanes to alkenes, alkenes to diolefins or alkylaromatic compounds to β-alkenylaromatic compounds by passing the appropriate hydrocarbon through a heated zone in the presence of steam the improvement which comprises employing the strontium nickel phosphate material of claim 1, a steam to hydrocarbon volume ratio at STP of 5:1 to 40:1, respectively, and a temperature of from 450° C. to 750° C. at a space velocity of from 100 to 700 volumes of hydrocarbon per volume of bed per hour.

27. The method of dehydrogenating hydrocarbons comprising continuously passing through a reaction zone a reactant hydrocarbon at a space velocity of from 50 to 500 volumes of hydrocarbon per volume of a catalyst per hour, said catalyst consisting essentially of a strontium nickel phosphate dehydrogenation catalyst of claim 1 while simultaneously passing through said reaction zone steam in an amount of from 1 to about 40 volumes per volume of hydrocarbon, oxygen in an amount of from .25 to 3 moles per mole of reactant hydrocarbon, and bromine in an amount of from 0.002 to 0.3 mole per mole of hydrocarbon and maintaining the reaction zone at a temperature of from about 400° to about 700° C.

28. The method of claim 26 in which an n-butene is dehydrogenated to butadiene.

29. The method of claim 27 in which an n-butene is dehydrogenated to butadiene.

30. The method of claim 27 in which n-butane is dehydrogenated to a mixture of n-butene and butadiene.

31. The method of claim 27 in which 2-methyl butane is dehydrogenated to a mixture of isoprene and 2-methyl butene.

References Cited
UNITED STATES PATENTS

| | | | |
|---|---|---|---|
| 1,215,335 | 2/1917 | Bosch et al. | 252—437 |
| 2,084,511 | 6/1937 | Small | 252—437 X |
| 2,926,207 | 2/1960 | Folkins et al. | 252—437 X |

PAUL M. COUGHLAN, JR., Primary Examiner

U.S. Cl. X.R.

23—105; 252—437; 260—680, 683.3

PO-1050
(5/69)

UNITED STATES PATENT OFFICE
CERTIFICATE OF CORRECTION

Patent No. 3,541,172            Dated    17 November 1970

Inventor(s)    Robert A. Stowe, Zen C. Hanger and Richard W. Roberts

It is certified that error appears in the above-identified patent and that said Letters Patent are hereby corrected as shown below:

In column 10, line 57, change "448,287" to -- 338,287 --.

In column 14, between lines 20 and 38, Table VII, change the heading in the 5th column from "$C_2H_6$" to -- $C_2H_4$ --.

In column 26, Claim 4, line 36, change "Nn" to -- Ni --.

Signed and sealed this 25th day of May 1971.

(SEAL)
Attest:

EDWARD M. FLETCHER, JR.            WILLIAM E. SCHUYLER, JR.
Attesting Officer                    Commissioner of Patents